(12) United States Patent
Maurer et al.

(10) Patent No.: US 8,870,707 B2
(45) Date of Patent: Oct. 28, 2014

(54) MULTISTAGE TRANSMISSION

(71) Applicant: ZF Friedrichshafen AG, Friedrichshafen (DE)

(72) Inventors: Markus Maurer, Lindau (DE); Torsten Buechner, Friedrichshafen (DE); Dominik Steinhauser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/025,099

(22) Filed: Sep. 12, 2013

(65) Prior Publication Data

US 2014/0073475 A1    Mar. 13, 2014

(30) Foreign Application Priority Data

Sep. 13, 2012 (DE) .......................... 10 2012 216 225

(51) Int. Cl.
*F16H 3/44* (2006.01)
*F16H 3/62* (2006.01)
*F16H 3/66* (2006.01)

(52) U.S. Cl.
CPC .......... *F16H 3/62* (2013.01); *F16H 2200/0056* (2013.01); *F16H 2200/0052* (2013.01); *F16H 2200/2046* (2013.01); *F16H 3/66* (2013.01); *F16H 2200/2012* (2013.01); *F16H 2200/0082* (2013.01)
USPC ........................... 475/286; 475/275; 475/290

(58) Field of Classification Search
CPC ..... F16H 3/62; F16H 3/66; F16H 2200/0052; F16H 2200/0056; F16H 2200/2012; F16H 2200/2046; F16H 2200/0082
USPC .................................. 475/275, 279, 286, 290
See application file for complete search history.

(56) References Cited

U.S. PATENT DOCUMENTS

| 1,404,675 A | 1/1922 | Wilson |
| 4,070,927 A | 1/1978 | Polak |

(Continued)

FOREIGN PATENT DOCUMENTS

| DE | 378413 | 7/1923 |
| DE | 27 21 719 A1 | 12/1977 |

(Continued)

OTHER PUBLICATIONS

Translation of JP 08074952 A Mar. 1996 Japan Enomoto et al.*

(Continued)

*Primary Examiner* — Michael Mansen
*Assistant Examiner* — Tinh Dang
(74) *Attorney, Agent, or Firm* — Davis & Bujold, PLLC; Michael J. Bujold (57) ABSTRACT

A transmission having basic and reversing transmissions. The basic transmission has planetary gearsets, shafts and shift elements. A sun of gearset (P1) couples the drive shaft, which can couple shaft (6) and the suns of gearsets (P2, P3), and shaft (5) and the carrier and ring of gearsets (P2, P3) respectively. Carrier of gearset (P1) couples shaft (4), which couples the ring of gearset (P2). The ring of gearset (P1) couples shaft (3). Shafts (3, 4, 5) can couple the housing. The output shaft couples the carrier of gearset (P3). The reversing transmission has a minus planetary gearset with a sun which couples and is driven by the basic transmission output, and a carrier that can couple the housing via a locking element, and a ring that couples the reversing transmission output which can couple, via another locking element, the basic transmission output.

6 Claims, 5 Drawing Sheets

(56) References Cited

U.S. PATENT DOCUMENTS

| | | | |
|---|---|---|---|
| 5,249,475 A * | 10/1993 | McAskill | 74/331 |
| 5,593,357 A * | 1/1997 | Justice et al. | 475/204 |
| 6,962,549 B2 | 11/2005 | Dreibholz et al. | |
| 7,014,589 B2 | 3/2006 | Stevenson | |
| 7,454,991 B2 * | 11/2008 | Buck et al. | 74/331 |
| 8,113,983 B2 | 2/2012 | Gumpoltsberger | |
| 8,398,522 B2 | 3/2013 | Bauknecht et al. | |
| 2010/0257952 A1 * | 10/2010 | Rieger et al. | 74/329 |

FOREIGN PATENT DOCUMENTS

| | | |
|---|---|---|
| DE | 42 34 572 A1 | 4/1994 |
| DE | 102 44 023 A1 | 4/2004 |
| DE | 10 2004 029 952 A1 | 1/2005 |
| DE | 10 2007 022 776 A1 | 12/2008 |
| DE | 10 2008 000 429 A1 | 9/2009 |
| DE | 10 2010 039 862 A1 | 3/2012 |
| EP | 0 965 773 A1 | 12/1999 |
| JP | H07 54941 A | 2/1995 |
| JP | H08 74952 A | 3/1996 |
| JP | 2006 046390 A | 2/2006 |
| JP | 2010 203 542 A | 9/2010 |

OTHER PUBLICATIONS

Translation of JP 2010203542 A Sep. 2010 Japan Kato et al.*
German Search Report corresponding to DE 10 2012 216 223.2 dated May 13, 2013.
German Search Report corresponding to DE 10 2012 216 226.7 dated May 13, 2013.
German Search Report corresponding to DE 10 2012 216 225.9 dated May 13, 2013.

* cited by examiner

Fig. 1

| GEAR/SE | TRANSMISSION RATIO | FRIC-TION A | FRIC-TION B | FRIC-TION D | FRIC-TION E | FRIC-TION F | CLAW K1 | CLAW K2 | GEAR CHANGE | GEAR INCREMENT | SHIFT TYPE |
|---|---|---|---|---|---|---|---|---|---|---|---|
| 1 | 6.35 | | | X | | X | | X | 1->2 | 1.89 | INTERRUPTION OF TRACTIVE FORCE |
| 2 | 3.36 | X | | | X | X | | | 2->3 | 1.76 | SHIFT UNDER LOAD |
| 3 | 1.91 | X | | | X | | X | | 3->4 | 1.34 | SHIFT UNDER LOAD |
| 4 | 1.42 | X | X | X | | | X | | 4->5 | 1.42 | SHIFT UNDER LOAD |
| 5 | 1.00 | | X | | | | X | | 5->6 | 1.39 | SHIFT UNDER LOAD |
| 6 | 0.72 | | X | X | | | X | | 6->7 | 1.17 | SHIFT UNDER LOAD |
| 7 | 0.62 | | X | | X | | X | | | | |
| -1 | -5.05 | X | | | | X | | X | 1->2 | 1.76 | SHIFT UNDER LOAD |
| -2 | -2.86 | X | | | X | | | X | 2->3 | 1.34 | SHIFT UNDER LOAD |
| -3 | -2.13 | X | | X | | | | X | 3->4 | 1.42 | SHIFT UNDER LOAD |
| -4 | -1.50 | | X | | | | | X | 4->5 | 1.39 | SHIFT UNDER LOAD |
| -5 | -1.08 | | X | X | | | | X | 5->6 | 1.17 | SHIFT UNDER LOAD |
| -6 | -0.92 | | | X | X | | | X | | | |
| OVERALL GEAR RATIO SPREAD: | 10.33 | | | | | | | | | | |
| TRANSMISSION RATIO P1: | -4.24 | | | | | | | | | | |
| TRANSMISSION RATIO P4: | -1.5 | | | | | | | | | | |
| STATIONARY TRANSMISSION RATIO GROUP: | -1.5 | | | | | | | | | | |

| GEAR/SE | TRANSMISSION RATIO | FRIC-TION A | FRIC-TION B | FRIC-TION D | FRIC-TION E | CLAW F | CLAW SE1 | CLAW SE2 | GEAR CHANGE | GEAR INCREMENT | SHIFT TYPE |
|---|---|---|---|---|---|---|---|---|---|---|---|
| V1 | 3.364 | X | | | | X | | | | | INTERRUPTION OF TRACTIVE FORCE |
| V2 | 1.909 | X | | | X | | | X | 1->2 | 1.76 | SHIFT UNDER LOAD |
| V3 | 1.421 | X | X | | | | | X | 2->3 | 1.34 | SHIFT UNDER LOAD |
| V4 | 1 | X | | X | | | | X | 3->4 | 1.42 | SHIFT UNDER LOAD |
| V5 | 0.72 | | X | X | | | | X | 4->5 | 1.39 | SHIFT UNDER LOAD |
| V6 | 0.615 | | X | | X | | | X | 5->6 | 1.17 | SHIFT UNDER LOAD |
| R1 | -3.364 | X | | | | X | X | | | | |
| R2 | -1.909 | X | | | X | | X | | 1->2 | 1.76 | SHIFT UNDER LOAD |
| R3 | -1.421 | X | X | | | | X | | 2->3 | 1.34 | SHIFT UNDER LOAD |
| R4 | -1 | X | | X | | | X | | 3->4 | 1.42 | SHIFT UNDER LOAD |
| R5 | -0.72 | | X | X | | | X | | 4->5 | 1.39 | SHIFT UNDER LOAD |
| R6 | -0.615 | | X | | X | | X | | 5->6 | 1.17 | SHIFT UNDER LOAD |
| OVERALL GEAR RATIO SPREAD: | 5.47 | | | | | | | | | | |
| TRANSMISSION RATIO GROUP: | -1 | | | | | | | | | | |
| STATIONARY TRANSMISSION RATIO GROUP: | -1 | | | | | | | | | | |

Fig. 5

| GEAR/SE | TRANSMISSION RATIO | FRICTION A | FRICTION B | FRICTION D | FRICTION E | CLAW F | CLAW SE1 | CLAW SE2 | GEAR CHANGE | GEAR INCREMENT | SHIFT TYPE |
|---|---|---|---|---|---|---|---|---|---|---|---|
| V1 | 6.73 | X | | | | X | X | | | | |
| V2 | 3.364 | X | | | | X | | | 1→2 | 2.00 | INTERRUPTION OF TRACTIVE FORCE |
| V3 | 1.909 | X | | | X | | | X | 2→3 | 1.76 | SHIFT UNDER LOAD |
| V4 | 1.421 | X | | X | | | | X | 3→4 | 1.34 | SHIFT UNDER LOAD |
| V5 | 1 | | X | | | | | X | 4→5 | 1.42 | SHIFT UNDER LOAD |
| V6 | 0.72 | | X | X | | | | X | 5→6 | 1.39 | SHIFT UNDER LOAD |
| V7 | 0.615 | | X | | X | | | X | 6→7 | 1.17 | SHIFT UNDER LOAD |
| OVERALL GEAR RATIO SPREAD: | 10.94 | | | | | | | | | | |
| TRANSMISSION RATIO GROUP: | 2 | | | | | | | | | | |
| STATIONARY TRANSMISSION RATIO GROUP: | -1 | | | | | | | | | | |

Fig. 6

MULTISTAGE TRANSMISSION

This application claims priority from German Application Serial No. 10 2012 216 225.9 filed Sep. 13, 2012.

FIELD OF THE INVENTION

The present invention relates to a multi-stage transmission of planetary design, in particular an automatic transmission for a motor vehicle, comprising a reversing transmission.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Automatically shiftable vehicle transmissions of planetary design are already generally described numerous times in the prior art and are continually undergoing further development and improvement. These transmissions should have a relatively simple design, in particular requiring a low number of shift elements, and minimize the need for double shifting when sequential shifting is performed, that is, avoiding engaging or disengaging two shift elements, thereby ensuring that only one shift element is ever switched when shifting is performed in defined groups of gears.

The document DE 2721719 A1 describes a multi-stage transmission in planetary design having six forward gears and one reverse gear comprising three minus planetary gear sets, called the first, second and third planetary gear sets in the following, disposed in a housing, six rotatable shafts, called drive shaft, output shaft, third, fourth, fifth and sixth shafts in the following, and five shift elements. Here, the sun gear of the first planetary gear set is connected to the drive shaft, which, via a first clutch, can be releasably connected to the sixth shaft connected to the sun gear of the second planetary gear set and to the sun gear of the third planetary gear set, and via a second clutch, can be releasably connected to the fifth shaft, connected to the carrier of the second planetary gear set and the ring gear of the third planetary gear set, and which can be coupled via a third brake to the housing. With the known transmission it is also provided that the carrier of the first planetary gear set is connected to the fourth shaft, which is connected to the ring gear of the second planetary gear set and can be coupled via a second brake to the housing, and that the ring gear of the first planetary gear set is connected to the third shaft, which can be coupled via a first brake to the housing, wherein the output shaft is connected to the carrier of the third planetary gear set. The brakes and clutches of the transmission are implemented as friction engaged shift elements, particularly as multi-disk shift elements.

Because two engaged shift elements are required for each gear with the transmission according to the document DE 2721719 A1, with each gear three friction engaged shift elements are disengaged, which disadvantageously results in undesired drag torques that negatively influence the efficiency of the transmission.

Further, it is provided that the first clutch is engaged for the first four forward gears, wherein the third brake is required only for implementing the first forward gear and is shifted into the power flow. This means that the first clutch and the third brake, because they are required for the first forward gear, are designed such that they support the entire engine torque including the maximum conversion. For the further gears of the transmission, a substantially smaller design of the shift elements would be sufficient.

Engaging a gear in the first forward gear, the coasting and tractive downshift from second gear into the first forward gear, and the coasting and tractive downshift from fifth gear in to the fourth forward gear, are qualitatively negatively influenced due to the maximum design of the first clutch and the third brake. In order to optimize the shift quality with these shifts, the number of disks of the first clutch and the third brake is reduced according to the prior art, which, however, disadvantageously results in reduced transfer capability of these shift elements in the first forward gear.

From the prior art, for example from the documents DE 10 2008 000 429 A1 and DE 10 2007 022 776 A1 from the applicant, transmissions in planetary design are known in which a portion of the shift elements are implemented as form-locking shift elements.

Due to the design of a portion of the shift elements of a transmission as form-locking shift elements, the power loss due to the drag torque of disengaged shift elements is reduced, and the transfer capability is increased with respect to the shift elements, wherein the mechanical overall gear ratio spread remains the same.

The mechanical overall gear ratio spread of a transmission is a key control variable for operating the upstream internal combustion engine at an optimal operating point, whereby the fuel consumption can be reduced. Further, the mechanical overall gear ratio spread of a transmission is an important parameter for attaining a specific driving performance in special applications.

Further developments of existing transmissions known from the prior art, implemented to be shiftable under load, result in a slight increase of the overall gear ratio spread and are disadvantageously complex and expensive.

Further from the prior art, it is known to combine automatic transmissions with additional automatically shiftable distributor transmissions for representing a group shift, which are integrated in the drive strategy, thereby increasing the mechanical overall gear ratio spread.

However, this design has the disadvantage that a two-stage distributor transmission is necessary for representing a group shift, which results in high manufacturing and assembly costs and large construction space needs. The distributor transmission, as a rule, is implemented as a transmission in countershaft design. Additionally, the distributor transmission, with respect to the attainable transmission ratio, the design of the form-locking shift elements and the synchronization measures, must be adapted to the upstream transmission and the internal combustion engine. In addition, the group shifts, disadvantageously, cannot be shifted under load.

Transmissions of road vehicles are used to some extent with special applications in the non-road range, such as rail cars or special-purpose vehicles (rail cars, motor boats, special-purpose vehicles in the high off-road range) in order to minimize costs. Bus transmissions are used particularly for applications in the high power range with rail car and special-purpose vehicle applications. Because these transmissions are adapted specifically to the requirements of buses, for the most part they have only one reverse gear, and for special applications, the transmission ratio spread is too low. For rail cars and for some special applications however, the same number of forward and reverse gears are necessary. Reversing transmissions can be used in this context.

The document EP 0 965 773 A1 from the applicant describes a reversing transmission in countershaft design. Such reversing transmissions are heavy, require a large construction space and result in high manufacturing and assembly costs. A further reversing transmission is disclosed in the document DE 10 2010 039 862 A1 from the applicant; the disclosed reversing transmission is designed as a separate assembly, and is disposed in the power flow direction in tractive mode behind a transmission.

SUMMARY OF THE INVENTION

Starting from a transmission according to DE 2721719 A1, the problem addressed by the present invention is to propose a multi-stage transmission in planetary design, in which a reversing transmission is implemented in a simple constructive manner and with small construction space requirements. Additionally, the multi-stage transmission should have a high mechanical overall gear ratio spread.

Accordingly, a multi-stage transmission according to the invention is proposed in planetary design, comprising a basic transmission and a reversing transmission downstream of the basic transmission, which are disposed in a common housing, wherein the basic transmission comprises an input drive and an output drive, three planetary gear sets, designated in the following as the first, second and third planetary gear sets, at least six rotatable shafts, designated in the following as input shaft, output shaft, third, fourth, fifth and sixth shafts, and at least five shift elements, the selective engagement of which results in different transmission ratios between the input drive and the output drive, wherein the sun gear of the first planetary gear set is connected to the drive shaft, which via a first clutch can be releasably connected to the sixth shaft connected to the sun gear of the second planetary gear set and to the sun gear of the third planetary gear set, and via a second clutch can be releasably connected to the fifth shaft connected to the carrier of the second planetary gear set and the ring gear of the third planetary gear set; the fifth shaft can be coupled to the housing via a third brake.

Additionally, the carrier of the first planetary gear set is connected to the fourth shaft which is connected to the ring gear of the second planetary gear set and can be coupled to the housing via a second brake, wherein the ring gear of the first planetary gear set is connected to the third shaft, which can be coupled to the housing via a first brake, and wherein the output shaft is connected to the carrier of the third planetary gear set.

According to a first embodiment of the invention, the reversing transmission has a simple minus planetary gear set, which is designated in the following as a fourth planetary gear set, the sun gear of which is connected to the output shaft of the basic transmission, which forms the input drive of the reversing transmission, the carrier of which can be coupled via a second shift element, preferably implemented as a form-locking shift element, to the housing of the basic transmission, and the ring gear of which is connected to the output shaft of the reversing transmission, serving as an output shaft of the multi-stage transmission, which can be releasably connected, via a first shift element preferably implemented as a form-locking shift element, to the output shaft of the basic transmission.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and results in a positive stationary transmission ratio.

The fourth planetary gear set preferably has a stationary transmission ratio of −1.5. When the first shift element of the reversing transmission is engaged, the input drive of the reversing transmission is directly connected to the output shaft of the multi-stage transmission such that a transmission ratio of 1 results with the gears generated in the basic transmission. When the second shift element of the reversing transmission is engaged, that is, with a stationary carrier, the ring gear of the reversing transmission connected to the output shaft of the multi-stage transmission has a direction of rotation opposite to that of the sun gear and this results in a translation ratio of −1.5.

Accordingly, the gears, resulting with the second shift element of the reversing transmission engaged, are not shifted with the same transmission ratio as with the corresponding gears in the case of the engaged first shift element, because these gears are identical in the basic transmission. Preferably, the gears resulting with the engaged second shift element of the reversing transmission are used as reverse gears.

Because the reverse gears resulting in this manner have a higher transmission ratio by a factor of 1.5, it can be provided that the transmission ratio of the basic transmission attributed to the first gear is not used for implementing a reverse gear. For the case that seven gears can be implemented in the basic transmission, accordingly six reverse gears are implemented, which for example correspond to the transmission ratios for the gears 2-7 of the basic transmission.

It is also possible, by engaging second shift element of the reversing transmission and the first and third brake of the basic transmission, to create a gear without a change in the direction of rotation, which has a high transmission ratio and can be used for implementing a crawler gear for special application with an off-road vehicle.

In the scope of a second embodiment of the invention, the reversing transmission has a double minus planetary gear set, namely a planetary gear set having a sun gear, a ring gear and stepped planet, which are mounted on a common carrier, wherein the sun gear meshes with the first planetary gear and the ring gear meshes with the second planetary gear of the stepped planet.

According to the invention, the sun gear of the double minus planetary gear set can be releasably connected via a first shift element, preferably implemented as a form-locking shift element, to the output shaft of the basic transmission forming the drive of the reversing transmission, wherein the output shaft of the basic transmission can be releasably connected directly, via a second shift element, preferably implemented as a form-locking shift element, to the output shaft of the reversing transmission serving as an output shaft of the multi-stage transmission, and connected to the ring gear of the double planetary gear set, and wherein the carrier of the double planetary gear set is coupled to the housing of the multi-stage transmission.

By engaging the second shift element of the reversing transmission, the output of the basic transmission is connected directly to the output shaft of the reversing transmission such that a transmission ratio of 1 results with the forward gears. By engaging the first shift element, a reversal of the direction of rotation is attained, wherein the elements of the reversing transmission are preferably adjusted to each other such that a transmission ratio of −1 results between the input of the reversing transmission connected to the sun gear and the output shaft of the reversing transmission connected to the ring gear.

This design, with a low constructional expense, guarantees that the forward and reverse gears of the transmission have the same transmission ratio, which is of particular significance for rail applications.

In the scope of a variant of the invention it is proposed that the output shaft of the reversing transmission serving as the output shaft of the multi-stage transmission is connected to the carrier of the reversing transmission, and that the ring gear is coupled to the housing, wherein, analogous to the preceding example, the sun gear of the double minus planetary gear set can be releasably connected via a first shift element, preferably implemented as a form-locking shift element, to the output shaft of the basic transmission forming the drive of the reversing transmission, and the output shaft of the basic transmission can be releasably connected directly, via a second form-locking shift element, to the output shaft of the reversing transmission serving as an output shaft of the multi-stage transmission.

Using this connection change of the carrier and the ring gear of the double minus planetary gear set of the reversing transmission, with the engaged first shift element, a high transmission ratio is attained with the rotational transmission ratio of the minus planetary gear set, without a reversal of the direction of rotation, which is of significance particularly for implementing crawler gears for an off-road vehicle special application. With the second shift element engaged, the output shaft of the basic transmission is connected directly to the output shaft of the multi-stage transmission, so that the transmission ratio of 1 results without a reversal of the direction of rotation. In this manner, the reversing transmission serves as a reduction stage.

The planetary gear sets of the basic transmission are preferably implemented as a minus planetary gear sets.

The design according to the invention, starting from the basic transmission, provides a multi-stage transmission that allows a reversal of the direction of rotation of the gears created in the basic transmission with low constructional expense. Advantageously, the constructional expense required is low because the existing basic transmission is expanded by a planetary gear set. Moreover, low additional construction space is required because the basic transmission is only expanded by one planetary gear set. A further advantage consists in that the basic transmission remains unchanged. In addition, using the described change in connection of the double minus planetary gear set, a transmission ratio stage is implemented for special applications, without a high constructional expense.

BRIEF DESCRIPTION OF THE DRAWINGS

The invention is described in greater detail in the following, as an example, with reference to the attached figures. They show.

DETAILED DESCRIPTION OF THE DRAWINGS

Figure 1:
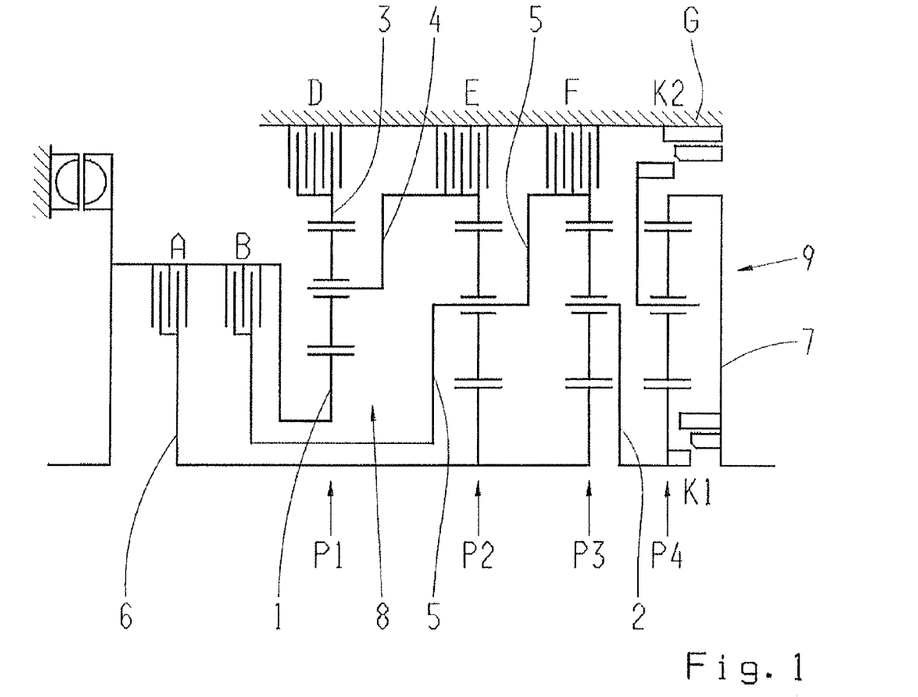
FIG. 1: a schematic view of a first preferred embodiment of a multi-stage transmission according to the invention, comprising a reversing transmission.

FIG. 1 shows a multi-stage transmission according to the invention, comprising a basic transmission 8 and a reversing transmission 9 that is downstream of the basic transmission 8. The basic transmission 8 comprises an input shaft 1, an output shaft 2 and three planetary gear sets P1, P2 and P3, which are disposed in a housing G. The planetary gear sets P1, P2 and P3, in the example shown are designed as minus planetary gear sets. Here, at least one of the planetary gear sets P1, P2, P3 can be implemented as a plus planetary gear set if the carrier and ring gear connection are exchanged and, simultaneously, the value of the stationary transmission ratio is increased by 1 . in comparison to the embodiment as a minus planetary gear set.

With the example embodiment shown, viewed in the axial direction, the planetary gear sets P1, P2, P3 are disposed in a series of the first planetary gear set P1, second planetary gear set P2, and third planetary gear set P3. The axial sequence of the individual planetary gear sets and the arrangement of the shift elements are freely selectable, as long as the connectability of the elements permits this.

As seen in FIG. 1, the basic transmission 8 has five shift elements, namely three brakes D, E, F and two clutches A, B. The spatial disposition of the shift elements can be arbitrary, and is limited only by the dimensions of the outer design. The basic transmission 8, according to the invention, has a total of six rotatable shafts, namely, the shafts 1, 2, 3, 4, 5 and 6, wherein the drive shaft forms the first shaft 1 and the output shaft forms the second shaft 2 of the basic transmission 8.

With the basic transmission 8, the sun gear of the first planetary gear set P1 is connected to the drive shaft 1, which, via a first clutch A, can be releasably connected to the sixth shaft 6 connected to the sun gear of the second planetary gear set P2 and to the sun gear of the third planetary gear set P3, and via a second clutch B can be releasably connected to the fifth shaft 5, connected to the carrier of the second planetary gear set P2 and the ring gear of the third planetary gear set P3, wherein the fifth shaft 5 can be coupled via a third brake F to the housing G.

With reference to FIG. 1, the carrier of the first planetary gear set P1 is connected to the fourth shaft 4, which is connected to the ring gear of the second planetary gear set P2 and can be coupled to the housing G via a second brake E. Additionally, the ring gear of the first planetary gear set P1 is connected to the third shaft 3, which can be coupled to the housing G via a first brake D, wherein the output shaft 2 of the basic transmission 8 is connected to the carrier of the third planetary gear set P3.

With the example shown, the first and second clutches A, B and the first, second and third brakes D, E, F are implemented as multi-disk shift elements. Alternatively, it is possible to implement the first clutch A and/or the third brake F as form-locking shift elements, whereby the drag torque is reduced.

According to the invention and with respect to FIG. 1, the reversing transmission 9 has a simple minus planetary gear set, which is designated in the following as the fourth planetary gear set P4, the sun gear of which is connected to the output shaft 2 of the basic transmission 8, which forms the drive of the reversing transmission 9, the carrier of which can be coupled via a second form-locking shift element K2 to the housing G, and the ring gear of which is connected to the output shaft 7 of the reversing transmission 9 serving as an output shaft of the multi-stage transmission. The output shaft 7 of the reversing transmission 9 can be releasably connected via a first form-locking shift element K1 to the output shaft 2 of the basic transmission 8.

Additional pressure regulators are not required for controlling the form-locking shift elements K1, K2, because magnet valves can be used for this purpose.

According to a further development of the invention, the first and the second shift elements K1, K2 can be controlled via an external control, for example pneumatically. This results in the advantage that the hydraulic control of the basic transmission 8 is not changed.

The fourth planetary gear set P4 has a stationary transmission ratio of −1.5. . When the first shift element K1 of the minus planetary gear set P4 of the reversing transmission 9 is engaged, there is a direct connection between the output shaft 2 of the basic transmission 8 and the output shaft 7 of the multi-stage transmission without a reversal of the direction of rotation such that with the gears created in the basic transmission, there is a transmission ratio of 1 . resulting between the drive shaft 1 and the output shaft 7 of the multi-stage transmission. These gears can be used as forward or reverse gears.

When the second shift element K2 of the minus planetary gear set P4 of the reversing transmission 9 is engaged, the ring gear of the minus planetary gear set P4 of the reversing transmission 9 connected to the output shaft 7 of the multi-staged transmission has a direction of rotation opposite to that of the sun gear, and results in a transmission ratio of −1.5 between the drive shaft 1 and the output shaft 7 of the multi-stage transmission for the gears created in the basic transmission.

Figure 2:
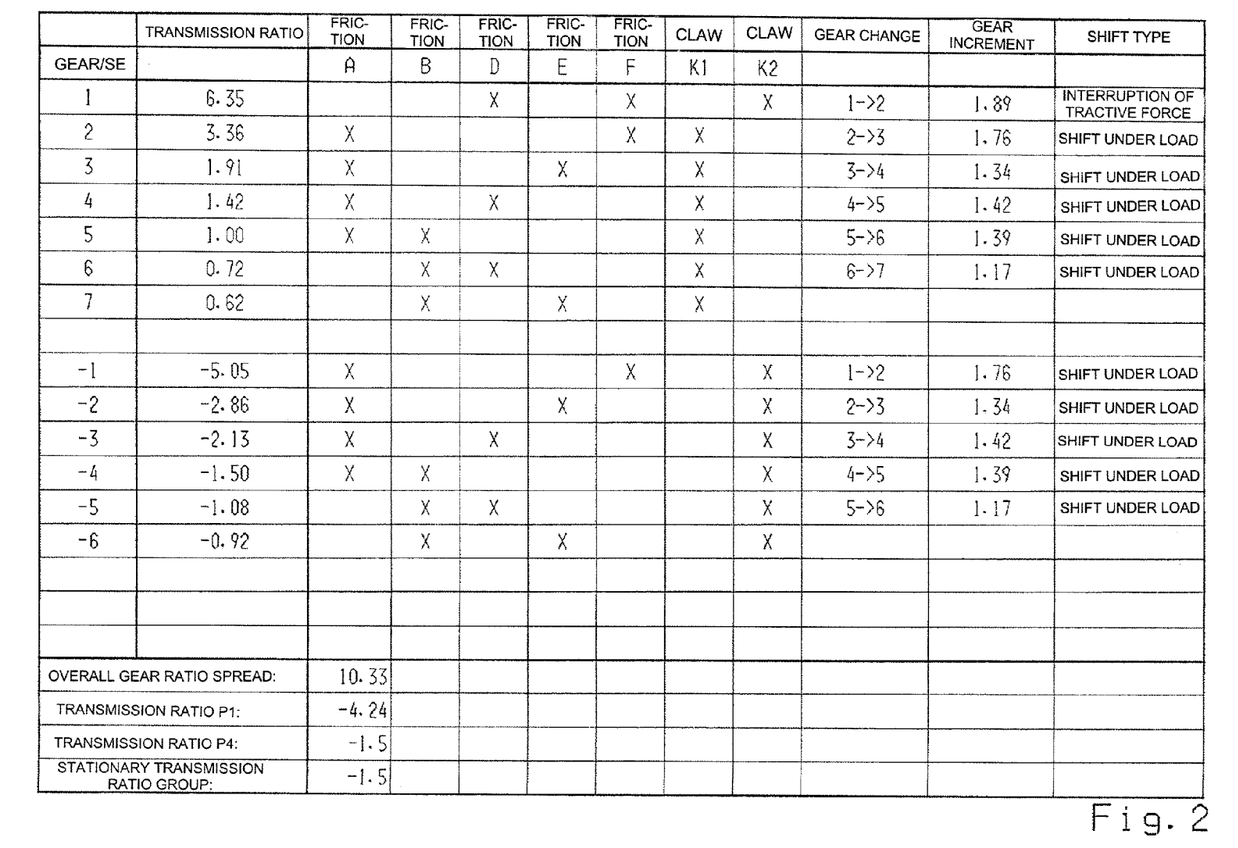
FIG. 2: an example of a shift pattern for the gears of the multi-stage transmission according to FIG. 1.

FIG. 2 shows an example shift pattern for the gears of a multi-stage transmission according to FIG. 1, wherein seven forward gears and six reverse gears can be implemented. With the forward gears, the gear changes 2-3, 3-4, 4-5, 5-6, 6-7 and 7-6, 6-5, 5-4, 4-3, 3-2. can be shifted under load. The mechanical overall gear ratio spread in the example shown is 10.33, wherein R1 designates the transmission ratio of the first reverse gear created in the group transmission 8. As seen in FIG. 2, a high transmission ratio and a high mechanical overall gear ratio spread are attained; the first forward gear results from engaging the second shift element K2 of the minus planetary gear set P4 of the reversing transmission 9 and the first and the third brake D, F of the basic transmission 8, and preferably is used for implementing a crawler gear for special applications.

The second forward gear results from engaging the first clutch A and the third brake F with the engaged first shift element K1 of the minus planetary gear set P4 of the reversing transmission 9; the third forward gear results from engaging the first clutch A and the second brake E with the engaged first shift element K1 of the minus planetary gear set P4 of the reversing transmission 9; the fourth forward gear results are engaging the first clutch A and the first brake D with the engaged first shift element K1 of the minus planetary gear set P4 of the reversing transmission 9; the fifth forward gear, designed in the example shown as a direct gear, results from engaging the first and the second clutches A, B with the engaged first shift element K1 of the minus planetary gear set P4 of the reversing transmission 9; the sixth forward gear results from engaging the second clutch B and the first brake D with the engaged first shift element K1 of the minus planetary gear set P4 of the reversing transmission 9; the seventh forward gear results from engaging the second clutch B and the second brake E with the engaged first shift element K1 of the minus planetary gear set P4 of the reversing transmission 9.

As seen in FIG. 2, the first reverse gear results from engaging the first clutch A and the third brake F with the engaged second shift element K2 of the minus planetary gear set P4 of the reversing transmission 9; the second reverse gear results from engaging the first clutch A and the second brake E with the engaged second shift element K2 of the minus planetary gear set P4 of the reversing transmission 9; the third reverse gear results from engaging the first clutch A and the first brake D with the engaged second shift element K2 of the minus planetary gear set P4 of the reversing transmission 9; the fourth reverse gear results from engaging the first and the second clutches A, B with the engaged second shift element K2 of the minus planetary gear set P4 of the reversing transmission 9; the fifth reverse gear results from engaging the second clutch B and the first brake D with the engaged second shift element K2 of the minus planetary gear set P4 of the reversing transmission 9; the sixth reverse gear results from engaging the second clutch B and the second brake E with the engaged second shift element K2 of the minus planetary gear set P4 of the reversing transmission 9.

The reverse gears 1-6 correspond to the transmission ratios of the basic transmission for the forward gears 2-7.

Figure 3:
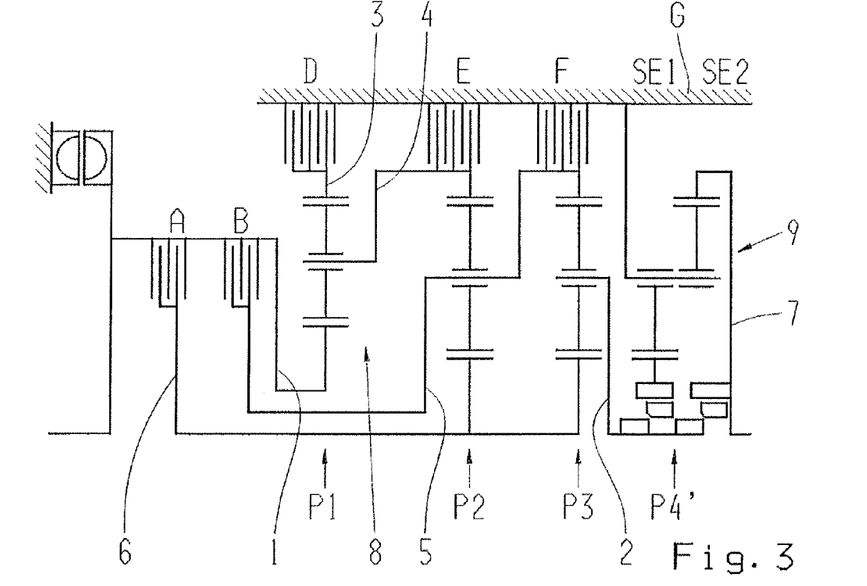
FIG. 3: a schematic view of a second preferred embodiment of a multi-stage transmission according to the invention, comprising a reversing transmission.

In the scope of a further embodiment of the invention, which is the subject matter of FIG. 3, it is proposed that a double minus planetary gear set P4' be used as a reversing transmission, namely a minus planetary gear set having a sun gear, a ring gear and a stepped planet, which are mounted on a common carrier, wherein the sun gear meshes with the first planetary gear and the ring gear meshes with the second planetary gear of the stepped planet.

According to the invention and with respect to FIG. 3, the sun gear of the double minus planetary gear set P4' can be releasably connected, via a first form-locking shift element SE1, to the output shaft 2 of the basic transmission 8, forming the drive of the reversing transmission 9. Additionally, the output shaft 2 of the basic transmission 8 can be releasably connected directly, via a second form-locking shift element SE2, to the output shaft 7 of the reversing transmission 9 serving as an output shaft of the multi-stage transmission and connected to the ring gear of the double minus planetary gear set P4'; the carrier of the double minus planetary gear set P4' is coupled to the housing G of the multi-stage transmission.

By engaging the second shift element SE2 of the double minus planetary gear set P4' of the reversing transmission 9, the output shaft 2 of the basic transmission 8 is connected directly to the output shaft 7 of the reversing transmission 9, whereby a transmission ratio of 1 results with the forward gears. In contrast, by engaging the first shift element SE1, a reversal of the direction of rotation is attained, wherein the elements of the double minus planetary gear set P4' of the reversing transmission 9 are adjusted to each other such that, likewise, a transmission ratio of −1 results between the drive 2 of the reversing transmission 9 connected to the sun gear and the output shaft 7 of the reversing transmission 9 connected to the ring gear.

No additional pressure regulators are required for controlling the form-locking shift elements SE1, SE2 because magnet valves can be used for this purpose.

According to a further development of the invention, the first and the second shift elements SE1, SE2 can be controlled via an external control, for example pneumatically. This results in the advantage that the hydraulic control of the basic transmission 8 is not changed.

Figure 4:
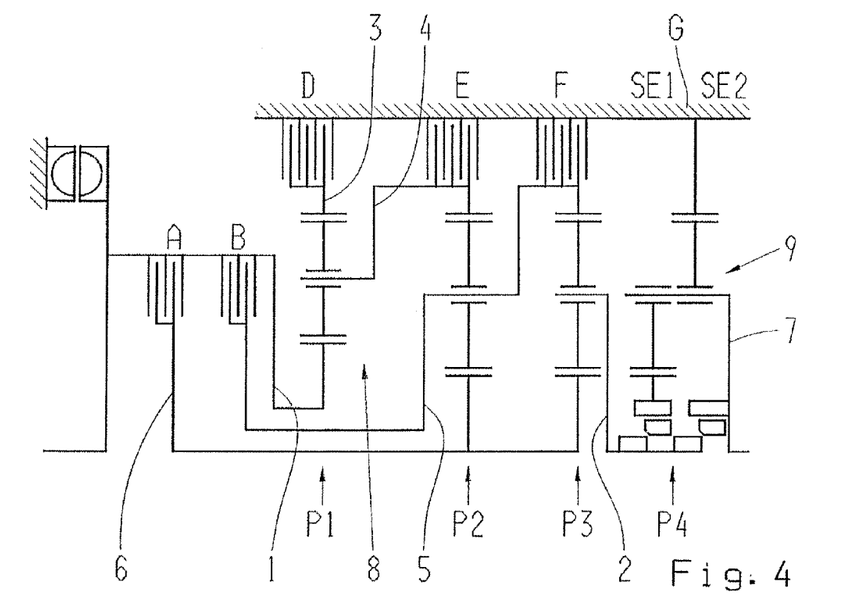
FIG. 4: a schematic view of a third preferred embodiment of a multi-stage transmission according to the invention, comprising a reversing transmission.

In the scope of a further development of the invention and with respect to FIG. 4, it is proposed that the output shaft 7 of the reversing transmission 9, serving as the output shaft of the multi-stage transmission, is connected to the carrier of the double minus planetary gear set P4' of the reversing transmission 9, wherein the ring gear of the double minus planetary gear set P4' of the reversing transmission 9 is coupled to the housing G. Analogous to the example embodiment according to FIG. 3, the sun gear of the double minus planetary gear set P4' of the reversing transmission 9 can be releasably connected, via a first form-locking shift element SE1, to the output shaft 2 of the basic transmission 8 forming the drive of the reversing transmission 9, wherein the output shaft 2 of the basic transmission 8 can be releasably connected, via a second form-locking shift element SE2, directly to the output shaft 7 of the reversing transmission 9 serving as an output shaft of the multi-stage transmission.

By exchanging the connection of the carrier and the ring gear of the double minus planetary gear set P4' of the reversing transmission 9, compared to the example embodiment according to FIG. 3, with the engaged first shift element SE1, a high transmission ratio is attained without a reversal of the direction of rotation, which is of particular significance for implementing a crawler gear for a special application with an off-road vehicle. By engaging the second shift element SE2 of the double minus planetary gear set P4', the output shaft 2 of the basic transmission 8 is connected directly to the output shaft 7 of the multi-stage transmission, whereby a transmission ratio of 1 results with the forward gears with respect to the gears generated in the basic transmission. Accordingly, the reversing transmission 9, by using the described connection change, serves as a transmission ratio stage.

Figure 5:
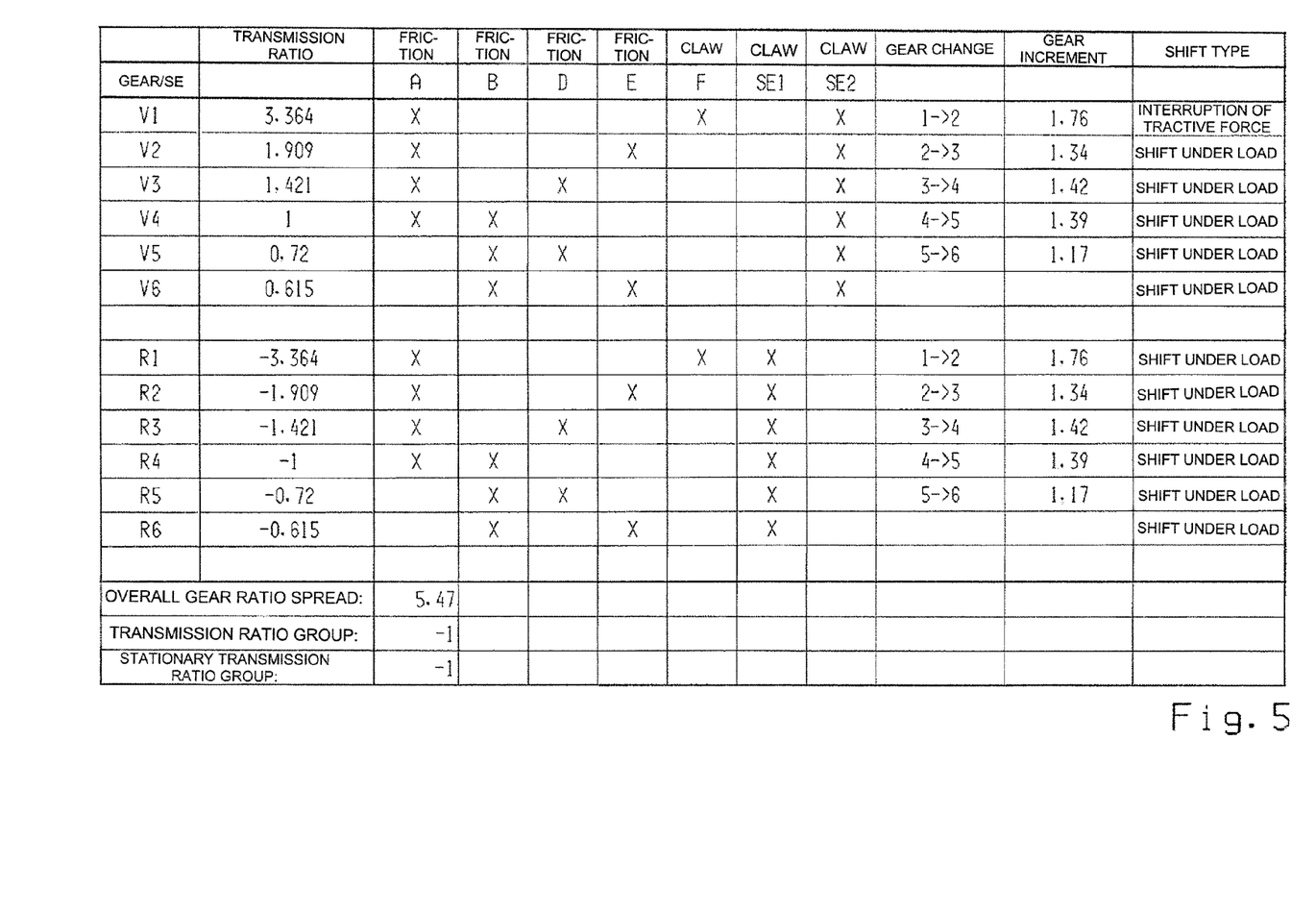
FIG. 5: an example of a shift pattern for the gears of the multi-stage transmission according to FIG. 3.

The subject matter of FIG. 5 is an example shift pattern for a transmission according to FIG. 3. With the example shown, six forward gears and six reverse gears can be implemented. When shifting sequentially, all gear changes can be shifted under load with the forward gears and with the reverse gears. In the example shown, the mechanical overall gear ratio spread is 5.47.

The second shift element SE2 of the double minus planetary gear set P4' of the reversing transmission 9 is engaged with all forward gears. The first forward gear results from engaging the first clutch A and the third brake F; the second forward gear results from engaging the first clutch A and the second brake E; the third forward gear results from engaging the first clutch A and the first brake D; the fourth forward gear, designed in the example shown as a direct gear, results from engaging the first and second clutches A, B; the fifth forward gear results from engaging the second clutch B and the first brake D; and the sixth forward gear results from engaging the second clutch B and the second brake E.

The reverse gears result with the engaged first shift element SE1 of the double minus planetary gear set P4' of the reversing transmission 9, wherein the further shift elements required for the reverse gears correspond to the shift elements required for the corresponding forward gears. By using the design according to the invention, as already explained, a change of the direction of rotation with the transmission ratio of −1 . is attained with the reverse gears.

Figure 6:
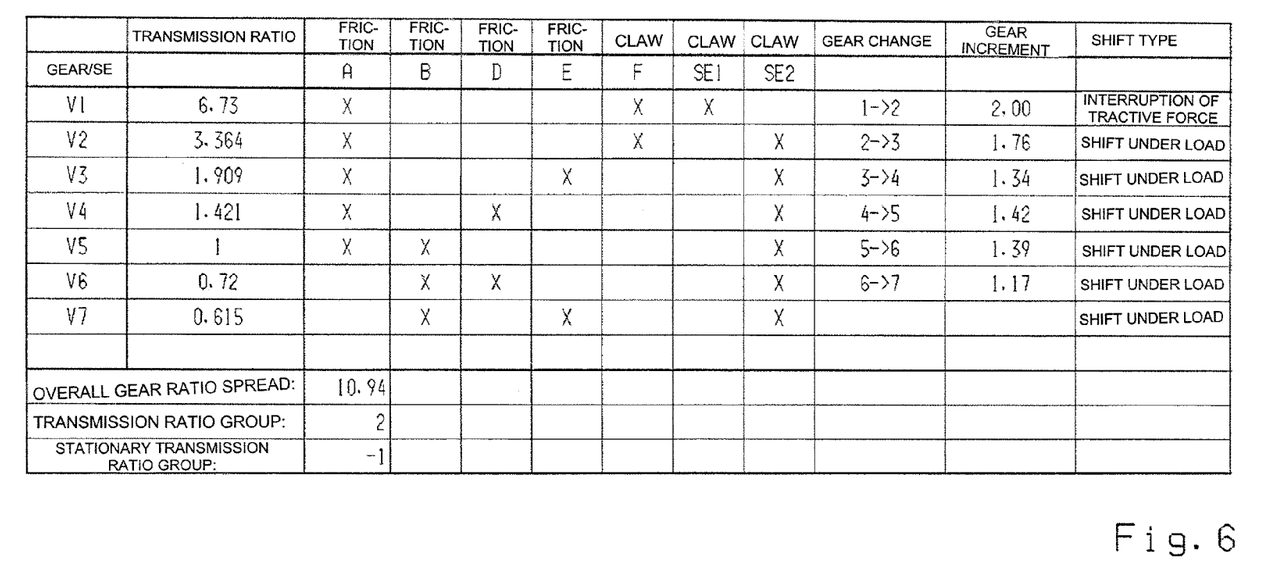
FIG. 6: an example of a shift pattern for the forward gears of the multi-stage transmission according to FIG. 4.

The subject matter of FIG. 6 is an example shift pattern for the forward gears of a transmission implemented according to FIG. 4. The overall gear ratio spread is 10.94, wherein the gear change from gears 2 to 7, with sequential shifting, can be shifted under load. The gear change from gear 1 to gear 2 can be shifted under load only when SE2 is a shift element that can be shifted under load. Here, the first forward gear results from engaging the first shift element SE1 of the double minus planetary gear set P4', the first clutch A and the third brake F, and is preferably used for implementing a crawler gear for special applications. By engaging the first shift element SE1, due to the rotational transmission ratio, which with the shown example amounts to 2, the transmission ratio of the first gear generated in the basic transmission 8 is doubled. The stationary transmission ratio of the double planetary gear set P4' with the example shown is −1. The gears 1-6 generated in the basic transmission 8 correspond to the gears 2-7, as explained in the following.

The second forward gear results from engaging the first clutch A and the third brake F with the engaged second shift element SE2 of the double minus planetary gear set P4'; the third forward gear results from engaging the first clutch A and the second brake E with the engaged second shift element SE2 of the double minus planetary gear set P4'; the fourth forward gear results from engaging the first clutch A and the first brake D with the engaged second shift element SE2 of the double minus planetary gear set P4'; the fifth forward gear, designed in the example shown as a direct gear, results from engaging the first and second clutches A, B with the engaged second shift element SE2 of the double minus planetary gear set P4'; the sixth forward gear results from engaging the second clutch B and the first brake D with the engaged second shift element SE2 of the double minus planetary gear set P4'; the seventh forward gear results from engaging the second clutch B and the second brake E with the engaged second shift element SE2 of the double minus planetary gear set P4'.

The at least one reverse gear that can be generated in the basic transmission 8 serves as a reverse gear, wherein the second shift element SE2 of the double minus planetary gear set P4' is engaged.

According to the invention, it is also optionally possible to provide additional freewheels at each suitable location of the multi-stage transmission, for example, between a shaft and the housing, or possibly to connect two shafts.

An axle differential and/or a distributor differential can be disposed on the drive side or on the output side.

The multi-stage transmission, according to the invention, also makes it possible to situate a torsional-vibration damper between the drive engine and the transmission.

Within the scope of a further, not represented embodiment of the invention, a wear-free brake, for instance, a hydraulic or electric retarder or the like, can be disposed on each shaft, preferably on the drive shaft 1 or the output shaft 7, which is of special significance in particular for use in commercial vehicles. Furthermore, a power take-off drive can be provided on each shaft, preferably on the drive shaft 1 or the output shaft 7, for driving additional assemblies.

A further advantage of the multi-stage transmission presented here is that an electric machine can be attached to each shaft as a generator and/or as an additional drive machine.

Reference Characters
1 first shaft, drive shaft
2 second shaft, output shaft of the basic transmission 8
3 third shaft
4 fourth shaft
5 fifth shaft
6 sixth shaft
7 output shaft of the reversing transmission 9
8 basic transmission
9 reversing transmission
A first clutch
B second clutch
D first brake
E second brake
F third brake K1 first shift element of the reversing transmission 9 implemented as a simple minus planetary gear set
K2 second shift element of the reversing transmission 9 implemented as a simple minus planetary gear set
SE1 first shift element of the reversing transmission 9 implemented as a double minus planetary gear set
SE2 second shift element of the reversing transmission 9 implemented as a double minus planetary gear set
G housing
P1 first planetary gear set
P2 second planetary gear set
P3 third planetary gear set
P4 fourth planetary gear set implemented as a simple minus planetary gear set
P4' fourth planetary gear set implemented as a double minus planetary gear set

The invention claimed is:

1. An automatic multistage transmission of a planetary design for a motor vehicle, the multistage transmission comprising:
    a basic transmission (8) and a reversing transmission (9) arranged downstream from the basic transmission (8);
    the basic transmission (8) comprising:
        a drive shaft (1), an output shaft (2) of the basic transmission (8) and first, second and third planetary gear sets (P1, P2, P3) which are disposed in a common housing (G), each of the first planetary gear set (P1), the second planetary gearset (P2) and the third planetary gear set (P3) having a sun gear, a ring gear and a carrier;
        third, fourth, fifth and sixth rotatable shafts (1, 2, 3, 4, 5, 6);
        five shift elements (A, B, D, E, F) comprising first, second and third brakes (D, E, F) and first and second clutches (A, B) whose selective engagement implementing different transmission ratios between the drive shaft (1) and the output shaft (2) of the basic transmission (8);
        the drive shaft (1) of the basic transmission (8) being continuously connected to the sun gear of the first planetary gear set (P1) and the drive shaft (1) being connectable, via the first clutch (A), to the sixth shaft (6) and, via the second clutch (B), to the fifth shaft (5), and the drive shaft (1) of the basic transmission (8) is a drive shaft of the multistage transmission;
        the output shaft (2) of the basic transmission (8) being continuously connected to the carrier of the third planetary gear set (P3);
        the third shaft (3) being continuously connected to the ring gear of the first planetary gear set (P1) and the third shaft (3) being connectable, via the first brake (D), to the housing (G);
        the fourth shaft (4) being continuously connected to the carrier of the first planetary gear set (P1) and the ring gear of the second planetary gear set (P2) and the fourth shaft (4) being connectable, via the second brake (E), to the housing (G);
        the fifth shaft (5) being continuously connected to the carrier of the second planetary gear set (P2) and the ring gear of the third planetary gear set (P3) and the fifth shaft (5) being connectable, via the third brake (F), to the housing (G);
        the sixth shaft (6) being continuously connected to the sun gear of the second planetary gear set (P2) and the sun gear of the third planetary gear set (P3); and the reversing transmission (9) comprising:
    a minus planetary gear set (P4) having a sun gear, a ring gear and a carrier, the sun gear of the minus planetary gear set (P4) being continuously connected to the output shaft (2) of the basic transmission (8) which drives the reversing transmission (9), the carrier of the minus planetary gear set (P4) being connectable, via a second form-locking shift element (K2), to the housing (G), and the ring gear of the minus planetary gear set (P4) being continuously connected to an output shaft (7) of the reversing transmission (9) which forms an output of the multistage transmission, and the output shaft (7) of the reversing transmission (9) being connectable, via a first form-locking shift element (K1), to the output shaft (2) of the basic transmission (8).

2. The multistage transmission according to claim 1, wherein the minus planetary gear set (P4) of the reversing transmission (9) has a stationary transmission ratio with a value −1.5, when the first shift element (K1) of the minus planetary gear set (P4) of the reversing transmission (9) is engaged, the output shaft (2) of the basic transmission (8) is directly connected to the output shaft (7) of the reversing transmission such that, with transmission ratios implemented in the basic transmission (8), a transmission ratio of 1 is implemented between the drive shaft (1) and the output shaft (7) of the reversing transmission, and when the second shift element (K2) of the minus planetary gear set (P4) of the reversing transmission (9) is engaged, the ring gear of the minus planetary gear set (P4) of the reversing transmission (9) which is connected to the output shaft (7) of the reversing transmission has a direction of rotation opposite to a direction of rotation of the sun gear of the minus planetary gear set (P4), and for gears created in the basic transmission (8), a transmission ratio of −1.5 is implemented between the drive shaft (1) and the output shaft (7) of the reversing transmission.

3. The multistage transmission according to claim 1, wherein seven forward gears and six reverse gears are engagable in the multistage transmission by selective engagement of the five shift elements of the basic transmission and the first and the second shift elements of the minus planetary gearset,
    a first forward gear is implemented by engagement of the second shift element (K2) of the minus planetary gear set (P4) of the reversing transmission (9) and the first and the third brakes (D, F) of the basic transmission (8);
    a second forward gear is implemented by engagement of the first clutch (A) and the third brake (F) with the engaged first shift element (K1) of the minus planetary gear set (P4) of the reversing transmission (9);
    a third forward gear is implemented by engagement of the first clutch (A) and the second brake (E) with the engaged first shift element (K1) of the minus planetary gear set (P4) of the reversing transmission (9);
    a fourth forward gear is implemented by engagement of the first clutch (A) and the first brake (D) with the engaged first shift element (K1) of the minus planetary gear set (P4) of the reversing transmission (9);
    a fifth forward gear is implemented by engagement of the first and the second clutches (A, B) with the engaged first shift element (K1) of the minus planetary gear set (P4) of the reversing transmission (9);
    a sixth forward gear is implemented by engagement of the second clutch (B) and the first brake (D) with the engaged first shift element (K1) of the minus planetary gear set (P4) of the reversing transmission (9); and a seventh forward gear is implemented by engagement of the second clutch (B) and the second brake (E) with the engaged first shift element (K1) of the minus planetary gear set (P4) of the reversing transmission (9);

a first reverse gear is implemented by engagement of the first clutch (A) and the third brake (F) with the engaged second shift element (K2) of the minus planetary gear set (P4) of the reversing transmission (9);

a second reverse gear is implemented by engagement of the first clutch (A) and the second brake (E) with the engaged second shift element (K2) of the minus planetary gear set (P4) of the reversing transmission (9);

a third reverse gear is implemented by engagement of the first clutch (A) and the first brake (D) with the engaged second shift element (K2) of the minus planetary gear set (P4) of the reversing transmission (9);

a fourth reverse gear is implemented by engagement of the first and the second clutches (A, B) with the engaged second shift element (K2) of the minus planetary gear set (P4) of the reversing transmission (9);

a fifth reverse gear is implemented by engagement of the second clutch (B) and the first brake (D) with the engaged second shift element (K2) of the minus planetary gear set (P4) of the reversing transmission (9); and a sixth reverse gear is implemented by engagement of the second clutch (B) and the second brake (E) with the engaged second shift element (K2) of the minus planetary gear set (P4) of the reversing transmission (9).

4. The multistage transmission according to claim 1, wherein at least one of the first clutch (A) and the third brake (F) of the basic transmission (8) is one of a form-locking shift element and a multi-disk shift element, and the second clutch (B) and the first and the second brakes (D, E) of the basic transmission (8) are multi-disk shift elements.

5. The multistage transmission according to claim 1, wherein the first, the second and the third planetary gear sets (P1, P2, P3) are minus planetary gear sets.

6. The multistage transmission according to claim 1, wherein the first and the second shift elements (K1, K2) of the minus planetary gear set (P4) of the reversing transmission (9) are controlled via an external actuation.

* * * * *